United States Patent [19]

Koenck et al.

[11] Patent Number: 5,576,529

[45] Date of Patent: *Nov. 19, 1996

[54] HAND-HELD OPTICALLY READABLE INFORMATION SET READER FOCUS WITH OPERATION OVER A RANGE OF DISTANCES

[75] Inventors: Steven E. Koenck; Jonathan R. White; Phillip Miller, all of Cedar Rapids, Iowa; George E. Hanson, Andover, Kans.; Arvin D. Danielson, Solon; Dennis A. Durbin, Cedar Rapids, both of Iowa

[73] Assignee: Norand Technology Corporation, Wilmington, Del.

[ * ] Notice: The term of this patent shall not extend beyond the expiration date of Pat. No. 5,308,966.

[21] Appl. No.: 309,334

[22] Filed: Sep. 19, 1994

Related U.S. Application Data

[63] Continuation-in-part of Ser. No. 215,112, Mar. 17, 1994, which is a continuation-in-part of Ser. No. 947,036, Sep. 16, 1992, Pat. No. 5,308,966, which is a continuation of Ser. No. 875,791, Apr. 27, 1992, abandoned, which is a continuation-in-part of Ser. No. 422,052, Oct. 16, 1989, abandoned, which is a division of Ser. No. 894,689, Oct. 8, 1986, Pat. No. 4,877,949.

[51] Int. Cl.$^6$ .................................................. G06K 7/10
[52] U.S. Cl. .......................................... 235/472; 235/462
[58] Field of Search .................................. 235/472, 462, 235/467, 455, 470, 471; 250/555, 566, 568; 369/45

[56] References Cited

U.S. PATENT DOCUMENTS

| | | | |
|---|---|---|---|
| 4,831,275 | 5/1989 | Drucker | 235/472 |
| 4,843,222 | 6/1989 | Hochgraf | 235/472 |
| 4,877,949 | 10/1989 | Danielson et al. | 235/462 |
| 5,308,966 | 5/1994 | Danielson et al. | 235/455 X |

*Primary Examiner*—John Shepperd
*Assistant Examiner*—Thien Minh Le
*Attorney, Agent, or Firm*—Suiter & Associates PC

[57] ABSTRACT

A hand-held optically readable information set reader having one or more photosensor arrays, at least one information set illuminator, and an information set image transfer system for projecting a readable image of an information set onto the one or more photosensor arrays.

5 Claims, 11 Drawing Sheets

HAND-HELD OPTICALLY READABLE INFORMATION SET READER FOCUS WITH OPERATION OVER A RANGE OF DISTANCES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES

Related Applications

The present application is a continuation-in-part of U.S. Ser. No. 08/215,112, DN 35740XYB, filed Mar. 17, 1994, which is a continuation-in-part of U.S. Ser. No. 07/947,036, DN 35740XYA, filed Sep. 16, 1992, now U.S. Pat. No. 5,308,966, issued May 3, 1994, which is a continuation of U.S. Ser. No. 07/875,791, DN 35740XY, filed Apr. 27, 1992, now abandoned, which is a continuation-in-part of U.S. Ser. No. 07/422,052, DN 35740X, filed Oct. 16, 1989, now abandoned, which is a division of U.S. Ser. No. 06/894,689, DN 35740, filed Oct. 8, 1986, now U.S. Pat. No. 4,877,949, issued Oct. 31, 1989. The disclosure of U.S. Ser. No. 07/422,052, DN 35740X, is incorporated herein by reference.

Incorporations by Reference

The following related commonly owned patent applications are incorporated herein by reference:

| Docket No. | Inventor(s) | Ser. N°. | Filing Date | Patent N° | Issue Date |
|---|---|---|---|---|---|
| 5726 | White | 06/905,779 | 09/10/86 | 4,882,476 | 11/21/89 |
| 6231 | Miller, et al | 07/136,097 | 12/21/87 | | |
| 5769X | Danielson, et al | 07/143,921 | 01/14/88 | | |
| 6240 | Koenck | 07/238,701 | 08/31/88 | | |
| 6697 | Main, et al | 07/321,932 | 03/09/89 | | |
| 6767 | Danielson, et al | 07/364,902 | 06/08/89 | WO/90/16033 | 12/27/90 |
| 5854BB | Chadima, et al | 07/339,953 | 04/18/89 | 4,894,523 | 01/16/90 |
| 35740X | Danielson, et al | 07/422,052 | 10/16/89 | 4,877,949 | 10/31/89 |
| 6649XX | Phillip Miller et al | 07/347,602 | 05/03/89 | | |
| 36767YXX | Koenck | 07/987,574 | 12/08/92 | | |

The subject matter of certain of the above cases has been published as follows:

| Ser. N° | Related Publication | Publication Date |
|---|---|---|
| 06/905,779 | U.S. Pat. No. 4,882,476 | 11/21/89 |
| 07/364,902 | WO 90/16033 | 12/27/90 |
| 07/422,052 | U.S. Pat. No. 4,877,949 | 10/31/89 |
| 07/339,953 | U.S. Pat. No. 4,894,523 | 01/16/90 |

The entire disclosures of the foregoing publications are incorporated herein in their entirety by reference. The following additional disclosures are also incorporated herein in their entirety by reference:

| PCT International Application N° | International Filing Date | International Publication N° | International Publication Date |
|---|---|---|---|
| PCT/US93/02139 | 10 March 1993 | WO 93/18478 | 16 Sept. 1993 |
| PCT/US92/06157 | 23 July 1992 | WO 93/14470 | 22 July 1993 |
| PCT/US94/05380 | 11 May 1994 | (Priority Date 11 May 1993) | |
| PCT/US93/12459 | 21 Dec. 1993 | WO 94/15314 | 7 July 1994 |

BACKGROUND OF THE INVENTION

The present invention is particularly concerned with improvements in instant optical character set readers of the type shown in U.S. Pat. Nos. 4,282,425 and 4,570,057. The disclosures of these U.S. patents are incorporated herein by reference by way of background.

The instant type of bar code reader with flashable illuminator means has proved to be extremely desirable for portable applications because of its unique simplicity and compact design. A significant goal of the present invention is to retain the major advantages of the present commercial instant readers with flashable illuminator means while enhancing the capacity for reading optical information sets of substantially greater dimesnion. An important related aspect of the invention is to enable the reading of such information sets by illuminating the same with an instantaneous flash of light while the information sets are at a greater distance from the frontal end of the reader. A further development goal is to more effectively adapt the reading operation both to close up information sets of high reflectivity and to labels at greater distances and of curved configuration.

SUMMARY OF THE INVENTION

The present invention is therefore particularly directed to the provision of an instant bar code reader which, while retaining the advantages of simplicity, ease of hand operation and ruggedness, achieves enhanced versatility by its ability to read optical information sets of greater length and multiple dimensions and to adapt to a greater range of reading distances. Such enhanced versatility is realized by providing the reader with an automatically controlled lens system and operating such control in accordance with a measure of reading distance. Further improvements are achieved by monitoring an average of reflected light from the bar code during a reading operation, and terminating integration of the reflected light from a bar code after an optimum measurement sample of the reflected light image has been received.

Aiming of the reader may be carried out with the assistance of visible marker light beams directed into the field of view of the reflected light image sensor. In an ideal embodiment, the marker beams extend from opposite ends of the information set image sensor through the reflected light optics so that the beams delineate the desired locations for the opposite ends of an information set in the reader field of view.

For the sake of energy conservation during portable operation, automatic control of the lens system may be disabled until such time as the information set is within an effective reading range. Where a capacitor discharge energizes a flashable illuminator, the capacitor discharge current may be interrupted as soon as an adequate amount of reflected light has been received; this not only reduces battery drain but also speeds up the capacitor recharging cycle. By monitoring the charge on the capacitor, a new reading cycle can be initiated after a minimum time lapse, should an initial reading cycle be unsuccessful. Accordingly, it is an object of the invention to provide an information set reader configuration particularly suited to hand held operation while exhibiting increased versatility.

A more specific object is to provide an information set reader capable of reading a wider range of information sets of varying types without sacrifice of essential simplicity and ease in hand held operation.

Another object is to provide an information set reader capable of rapid and efficient alignment with information sets located at substantial distances from the reader.

A further object of the invention is to provide an instant information set reader which achieves the foregoing objects while minimizing energy consumption so as to retain a capacity for extended portable operation.

A feature of the invention resides in the provision of an adaptive bar code image sensor system enabling a succession of readings of a given information set with reflected light from respective different segments of such information set controlling respective integration times. This feature is applicable, for example, to information sets on curved substrates such that an information set reading with a single integration time would not effectively sample reflected light from all segments of the label.

Further features leading to enhanced adaptability of the code image sensor system comprise individually operable flash illumination means enabling more rapid flash sequences, and/or enabling improved illumination of irregular or curved code configurations and/or of code configurations of greater extent, and/or enabling respective individually controlled flash durations immediately following each other, and e.g. adapted to respective different segments of a code configuration.

Still further features of an adaptive code image sensor system relate to simultaneous reading of code segments at markedly different depths of field and/or multiple depth measurement sensors for assessing the depth of respective segments of a code configuration, and/or selectable range, distance to image sensors effectively adapted to read code configurations at respective overlapping ranges for instantaneous adaptation to a code configuration at any range, distance over a wide range without the use of moving parts. In one implementation, the effective usable range of a lens system is greatly increased by providing multiple optical image paths of respective different lengths in the reader which lead through the lens system to respective independently controllable image sensors.

Another feature resides in the provision of a marker beam indicator system for delineating the optimum location for an information set in the reader field of view so that the reader can be positioned rapidly and efficiently even while at substantial distances from an optically readable information set. Various method features will be apparent from the following disclosure. For example, in a case where a curved bar code label (or other optically readable information set) has a central segment within the focal depth of the lens system, but the marginal segments are actually outside the focal depth, one exemplary method of programmed operation may provide for a second flash automatically after the lens system has automatically focused at a selected greater depth. By assembling the two readings, e.g. pixel by pixel, a good reading may be obtained with, e.g., valid start and stop characters being obtained from the second reading. In another method of programmed operation, a display forming part of the operator input/output means can instruct the operator to take first a reading of the left hand portion of a severely curved label, then a central portion and then a right hand portion, with the processor assembling the pixels of the respective readings to obtain a complete bar code image reading.

The operator could, in another mode, advise the reader processor, e.g., by the selective actuation of function keys or the like, of a particular reading sequence to be input to the reader processor for extremely long or sharply curved labels. The function keys could be part of a keyboard associated with the reader itself and/or a keyboard associated with a host computer unit directly mechanically coupled with the reader housing, or coupled via any suitable remote linkage means such as a cable or a radio frequency channel. In certain instances, the reader processor may assemble the pixels of successive readings not only with the assistance of internal check characters and preknowledge of code formats and the like and/or of specific reading sequences, but further with the assistance of measurements from multiple distance measurement sensors defining the general bar code spacial configuration. Utilizing multiple flashable illuminators and/ or multiple intensity sensors may enable valid reading of different segments while avoiding in all cases, any saturation of CCD charge wells or the like of an image sensor. Saturation of any part of a CCD shift register may adversely affect subsequent operation of an image sensor.

Other objects, features and advantages of the invention will be apparent from the following detailed description taken in conjunction with the accompanying sheets of drawings, and from the features and relationships of the appended claims.

BRIEF DESCRIPTION OF THE DRAWINGS

FIGS. 6A through 6F show waveforms useful for explaining the operation of the circuit of FIG. 6;

DETAILED DESCRIPTION

I. Description of FIGS. 1–14

Figure 1:
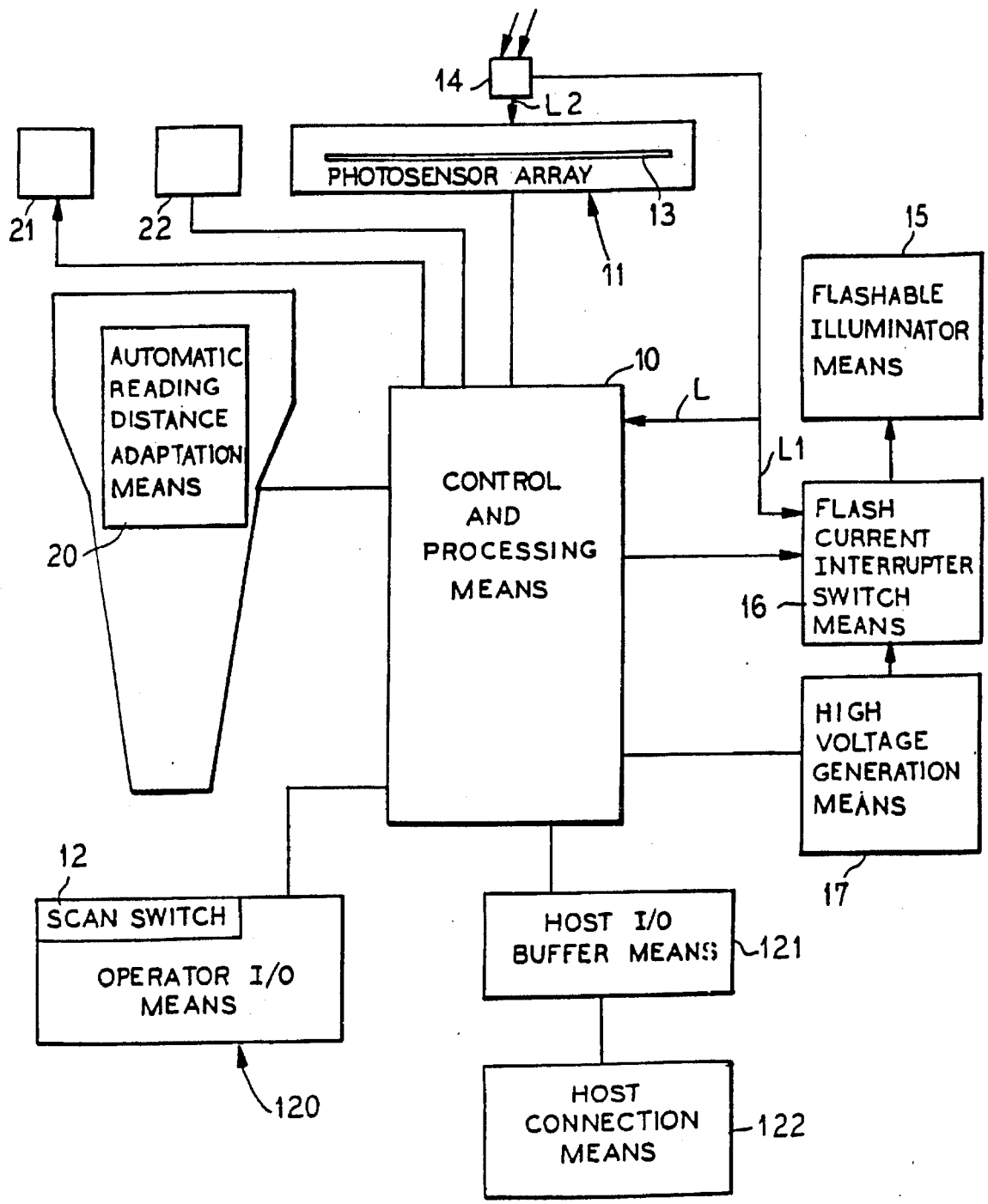
FIG. 1 is a block diagram illustrating a preferred embodiment of the present invention.

FIG. 1 illustrates a preferred instant bar code reader system for extending the versatility of a commercial bar code reader such as shown in U.S. Pat. No. 4,570,057. Component 10, FIG. 1, may represent a control and processing means for the system and may include a central processing unit, memory units and analog to digital conversion channels.

The central processing unit and associated memory form the main control portion of the system. The other functional blocks of FIG. 1 maybe inputs or outputs with respect to the central processing unit. The central processing unit may be a microprocessor that executes the program to control the operation of the reader. The microprocessor acts as a microcontroller with the capability of sensing and controlling the functional elements of the bar code reader, and decoding the bar code as supplied from a bar code image sensor means 11. Where the reader is coupled on line with a host computer system, (for example by a host connection means in the form of a flexible cable), the decoded bar signal is transmitted to the host under the control of the central processing unit. The microprocessor is capable of static operation with shut-down for power conservation. Wake-up of the processor will occur when an operator actuates a scan switch 12.

An electrically erasable read only memory of component 10 may be utilized to store parameters and special modifiable decoding sequences for the bar code reader operation. Examples of these parameters would be label code, and input/output speed and control format. Component 10 may also include a random access memory for data collection, decoding work space and buffer storage of the decoded label data for transmission to a host computer, for example. The random access memory can be internal to the microprocessor chip or reside on a data bus. The analog/digital channels are for receiving the bar code signals generated by the bar code image sensor means 11 and for other purposes as will be hereafter explained.

The image sensor means may, for example, include a photosensor array indicated diagrammatically at 13 having a one dimensional linear array of photodiodes for detecting the bar code reflection image. To read labels with bar code lengths of greater than seven inches with high resolution requires that the array have relatively high resolution. By way of example, the array 13 may comprise five thousand photodiode circuits (5,000 pixels) and provide approximately three photodiode circuits (3 pixels) for each five mils (0.005 inch) of a bar code length. (Each pixel of array 13 may have a length of about seven microns.) A charge coupled device (CCD) shift register may be arranged to receive bar code signal elements from the respective photodiode circuits after a suitable integration interval. Once the bar code signal elements have been transferred to the shift register, the signal elements are retained independently of further exposure of the photodiodes to reflected light from the bar code.

In the embodiment of FIG. 1, an intensity sensor 14 is provided and may comprise a photodiode that will determine the relative amount of light exposure of the photosensor array 13. If component 10 operates at sufficiently high speed, the signal from the intensity sensor 14 may be supplied exclusively to component 10 via an analog/digital channel so that the control and processing means can determine the optimum point for transfer of the bar code image signals to the shift register. Likewise, many CCD's now have an electronic shutter. In the foregoing example the sensor 14 could drive a circuit to condition the input and drive the CCD shutter pin (simple non-processor controlled exposure control). The shutter control line stops the photo-discharge of the internal CCD capacitors. This may be achieved electronically. Further exposure during the cycle results in no further charge reductions (see, for example, FIG. 56).

In a presently preferred implementation, however, the intensity sensor mean 14 is directly coupled with the hardware control circuits of the flashable illuminator means and of the bar code image sensor means, and this is indicated by dash lines L1 and L2 in FIG. 1; in this case, line L is used only so that the processor component 10 is advised that a flash has actually occurred. In a preferred embodiment wherein a flashable illuminator 15 is driven by capacitor discharge current, a component 16 may effect interruption of the flow of current from the capacitor based directly on the signal supplied via L1 from intensity sensor 14. In this way, energy is conserved, and recharging of the capacitor speeded up. Component 16 may comprise a flash current interrupter switch means, e.g., a solid state switch which is controlled to interrupt discharge of the capacitor of high voltage generation unit 17, and thus, to terminate the flash of light from the flashable illuminator 15 when intensity sensor 14 indicates that adequate reflected light has been received from a bar code.

Figure 2:
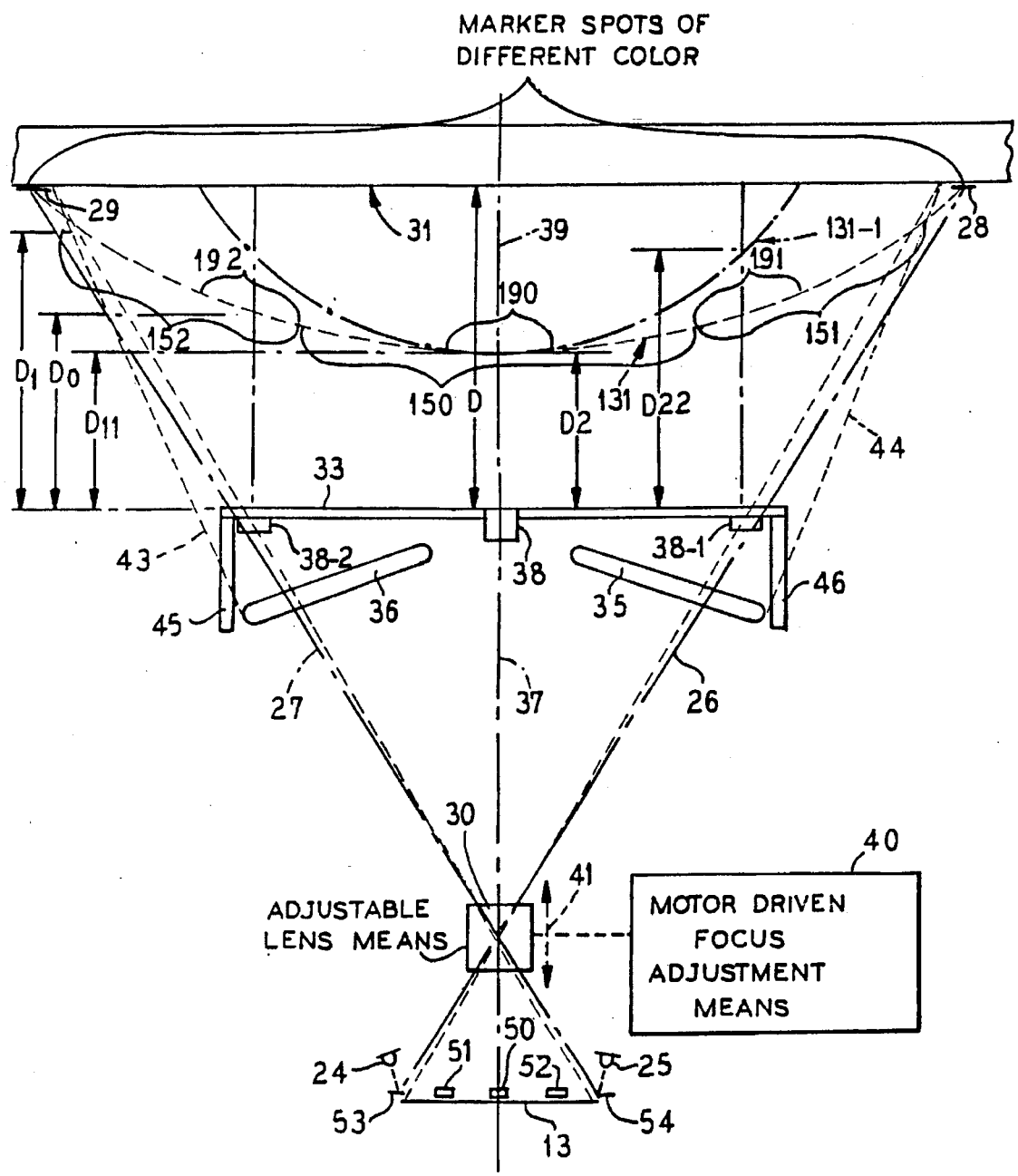
FIG. 2 is a diagrammatic view useful for explaining certain features of a specific exemplary embodiment of the invention.

The system of FIG. 1 is also indicated as including a reading distance adaptation means 20, label guide indicator means 21 and reading distance sensor means 22. These components are best understood by reference to a specific example as shown in FIG. 2. FIG. 2 illustrates an exemplary configuration wherein the label guide indicator means 21 (FIG. 1) is provided by a pair of marker light emitting diodes 24 and 25 which produce light beams 26 and 27 extending from opposite ends of the photosensor array 13 through the lens system indicated at 30 so as to delineate by means of marker light spots at 28 and 29 on the label the field of view of the reader. FIG. 2 illustrates a situation where label 31 has a bar code with a length greater than seven inches and is located at a distance D from a frontal window part 33 of the reader of greater than two inches, for example, three inches. By way of example in FIG. 2, flashable illuminator 15 of FIG. 1 is illustrated as being implemented by two flash tubes 35 and 36 directed obliquely outwardly relative to a central axis 37 of the reader. FIG. 2 also illustrates the provision of an ultrasonic transducer 38 for implementing component 22 of FIG. 1. For example, transducer 38 may emit an ultrasonic pulse along an axis 39 aligned with the reader central plane such that the time of arrival of a reflected pulse from the bar code label 31 provides a measure of reading distance. In place of or in addition to distance sensor 38, infrared distance measurement sensors 38-1 and 38-2 are provided in FIG. 2, with axes arranged to intersect a curved label generally at a mean distance (e.g. at $D_0$ equal to one-half the sum of the maximum distance $D_1$ and the minimum distance $D_1$). By way of example, adaptation means 20 may include motor driven focus adjustment means 40 coupled with the lens system 30 for adjusting the lens system parallel to the central optical axis 37, as represented by the double-headed arrow 41. In the example of U.S. Pat. No. 4,570,057, the reader has a width dimension at its frontal wall which is greater than the extent of the exit light path at the plane of such frontal wall. However, in the specific configuration of FIG. 2, it will be observed that marginal light rays 43 and 44 from the flash tubes 35 and 36 are transmitted by transparent side walls 45 and 46 of the reader housing so that in this case the illumination field has a total extent at the plane of the reader frontal wall which is substantially greater than the width dimension of such frontal wall.

In FIG. 2, a photodiode intensity sensor 50 corresponding to component 14 of FIG. 1 is indicated as being mounted centrally as defined by a plane intersecting the optical axis 37, but offset from photosensor array 13 so as not to obstruct light incident thereon. (Optical axis 37 intersects photodiode array 13.) Intensity sensor 50 is preferably placed so as to intercept light of maximum intensity as reflected from the label 31. By way of example, intensity sensors such as 50, 51 and 52 may be located at respective different locations adjacent sensor array 13 as indicated, and successive ones of the sensors may be selected for actual control of bar code image integration time during successive bar code reading operations for a given curved bar code configuration as will be hereafter explained.

Figure 3:
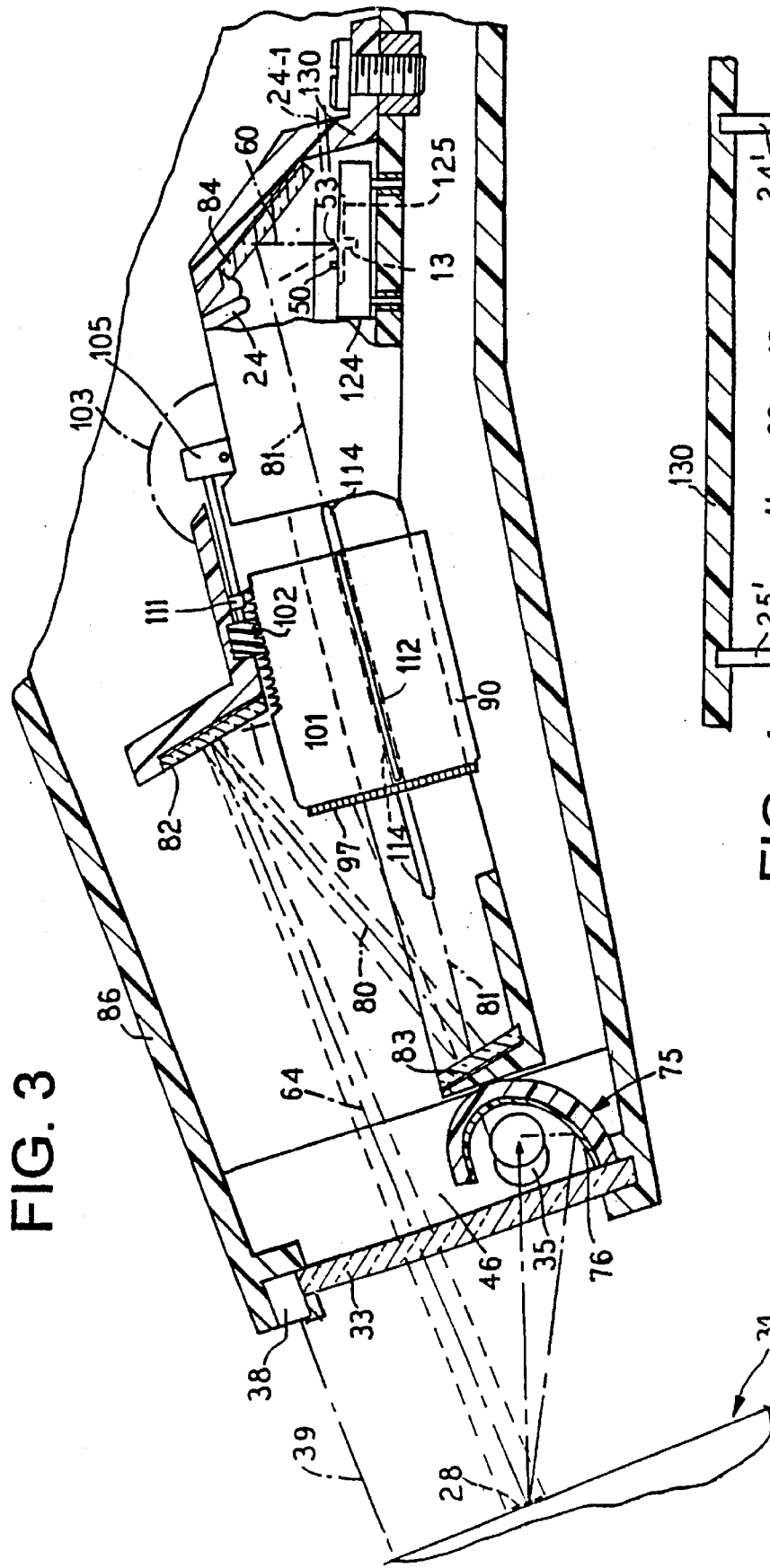
FIG. 3 is a somewhat diagrammatic partial longitudinal sectional view for indicating the application of certain features of the present invention to is an instant optically readable information reader generally as shown in U.S. Pat. No. 4,570,057.

In the example of FIG. 2, mirror elements 53 and 54 are mounted at opposite ends of photosensor array 13 for reflecting light from the sources 24 and 25 along the beam paths 26 and 27. Components such as 11, 14, 15, 20, 21 and 22 of FIG. 1 may be implemented as shown in FIG. 3. FIG. 3 may be taken as supplementing FIG. 2, and corresponding reference numerals have been used in FIGS. 2 and 3 to designate similar parts.

Referring to the physical arrangement of parts as indicated in FIG. 3, the location of the intensity sensors such as 51 to one side of a central optical axis 60 is indicated. Considering the plane which intersects the photosensor array 13 and coincides with the optical axis 60, it will be understood that mirrors such as 53 will each have a location centered on such plane. As indicated in FIG. 3, ultrasonic transducer 38 (FIG. 3) may be located just above window 33 with its axis 39 directed generally parallel to the optical axis 64 (which indicates the axis for the reflected light entering the reader).

In conformity with FIG. 2, the reader is shown as having transparent side wall portions such as 46 at the respective sides of the reader, corresponding to the transparent portions 45 and 46 in FIG. 2. Each of the flash lamp tubes 35 and 36 may be provided with a housing 75 and an interior reflector 76 with a configuration as described as U.S. Pat. No. 4,570,057. At a depth of approximately three inches in front of the window 33, the flash illumination means 35 and 36 may effectively illuminate a sensing region having an extent greater than seven inches, for example.

Reflected light from a bar code label 31 follows an optical path as indicated at 64, 80, 81 and 60 in FIG. 3 by virtue of the arrangement of mirrors 82, 83 and 84. These mirrors are fixed relative to reader housing 86, while a lens barrel 90 carrying optical lenses is axially adjustable relative to the reader housing. Also preferably forming part of the adjustable lens barrel assembly 90 are an infrared rejecting filter 97 and a rectangular aperture element analogous to that of U.S. Pat. No. 4,570,057. For the sake of diagrammatic indication, barrel assembly 90 is shown as having a series of gear teeth (rack) 101 meshing with a worm gear drive 102 which is driven from an adjustment motor 103 via a right angle drive coupling assembly 105. The barrel assembly 90 may have a range of adjustment so as to accommodate bar code labels closely adjacent to the frontal window 33 and at progressively greater distances in front of the window 33 up to reading distances of at least three inches.

In FIG. 3, a bearing for the shaft of worm gear 102 is indicated at 111. Guide means for lens barrel 90 are indicated as comprising flanges such as 112 for riding in cooperating slot-like low friction guideways such as 114. An alternative location for the light emitting diodes 24 and 25 is indicated at 24-1 in FIG. 3. An analog to digital conversion channel of component 10, FIG. 1 may be utilized to monitor charge build-up in the high voltage generation component 17 so that a flash of the illuminator means 15 will take place only when the desired amount of flash driving current is available.

Other analog to digital conversion channels may read the light intensity values accumulated by intensity sensors 50, 51 and 52, so that such intensity values can determine respective bar code image integration times, where desired.

Component 120 in FIG. 1 represents audio and visual status indicators for facilitating operation of the reader unit. For example, a red-light-emitting diode indicator may be energized whenever a thumb actuator controlling read enable switch 12 is pressed and the reading distance sensor means determines that a bar code label is beyond the maximum reading distance of the reading distance adaptation means 20. At such a distance outside of the operative reading range, the lens adjustment motor 103, FIG. 3, follows an optical path as indicated at 64, 80, 81 and 60 in FIG. 3 by virtue of the arrangement of mirrors 82, 83 and 84. These mirrors cire fixed relative to reader housing 86, while a lens barrel 90 carrying optical lenses is axially adjustable relative to the reader housing. Also preferably forming part of the adjustable lens barrel assembly 90 are an infrared rejecting filter 97 and a rectangular aperture element analogous to that of U.S. Pat. No. 4,570,057. For the sake of diagrammatic indication, barrel assembly 90 is shown as having a series of gear teeth 101 meshing with a worm gear drive 102 which is driven from an adjustment motor 103 via a right angle drive coupling assembly 105. The barrel assembly 90 may have a range of adjustment so as to accommodate bar code labels closely adjacent to the frontal window 33 and at progressively greater distances in front of the window 33 up to reading distances of at least three inches. In FIG. 3, a bearing for the shaft of worm gear 102 is indicated at 111. Guide means for lens barrel 90 are indicated as comprising flanges such as 112 for riding in cooperating slot-like low friction guideways such as 114.

An alternative location for the light emitting diodes 24 and 25 is indicated at 24-1 in FIG. 3. An analog to digital conversion channel of component 10, FIG. 1, may be utilized to monitor charge build-up in the high voltage generation component 17 so that a flash of the illuminator means 15 will take place only when the desired amount of charge is available. Other analog to digital conversion channels may read the light intensity values accumulated by intensity sensors 50, 51 and 52, so that such intensity values can determine respective bar code image integration times, where desired.

Component 120 in FIG. 1 represents audio and visual status indicators for facilitating operation of the reader unit. For example, a red-light-emitting diode indicator may be energized whenever a thumb actuator controlling read enable switch 12 is pressed and the reading distance sensor means determines that a bar code label is beyond the maximum reading distance of the reading distance adaptation means 20. At such a distance outside of the operative reading range, the lens adjustment motor 103, FIG. 3, may be disabled, e.g., by the programming of control and processing means to conserve power. When the reader is within the operative range, if the thumb operated switch 12 is actuated, motor 103 is essentially continuously controlled according to successive distance readings. If a good bar code reading is accomplished, means 120 may produce a relatively long single beep and turn on a green light emitting indicator diode. Where a bad bar code reading situation is determined, e.g., after a selected number of reading attempts, means 120 may generate three short beeps, for example. The programming may be such that once a good reading or bad reading condition is determined, the user must release the thumb switch and depress it again to initiate another read sequence. Indicator lamps and a beeper have been shown in the seventh figure of U.S. Pat. No. 4,570,057 and are described therein at column 11, lines 37-43. The indicator lights may be physically located of rwardly of the thumb switch as can be seen in the first figure of U.S. Pat. No. 4,570,057.

FIG. 1 also indicates an input/output buffer component 121 for coupling the control and processing means 10 with a host processor or the like. A connection means 122 may directly receive a host processor so that the host processor housing is physically attached with the reader housing. As another example, connection means 122 may comprise a cable containing six conductors. Preferably, such a cable would be detachable at the reader. In this second example, all needed voltages may be generated in the reader from plus five volts supplied by two of the six conductors (+5V, GND). The other four signal lines of the cable are preferably independently programmable as inputs or outputs. By way of example, the host processor may be part of a portable hand held computer such as shown in U.S. Pat. Nos. 4,455,523 and 4,553,081. The rechargeable batteries of the portable computer may supply all needed power to the reader unit of the present invention. In the second example, a host computer unit can be carried in a belt holster for example during extended use of the reader unit of the present invention.

Figure 4:
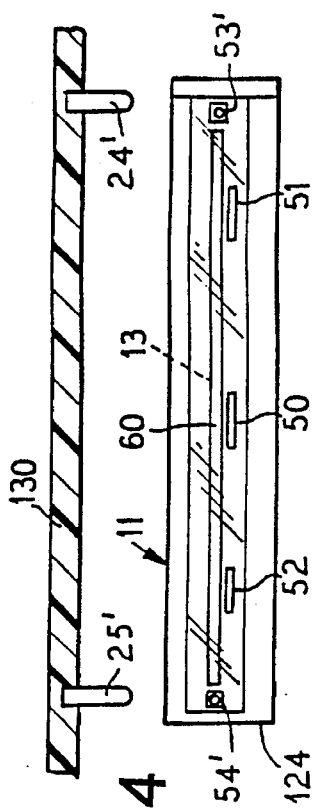
FIG. 4 is a somewhat diagrammatic plan view illustrating an adaptive information set image sensor system in accordance with the present invention, and also illustrating an alternative information set guide indicator arrangement for the reader of FIG. 3.

FIG. 4 is a somewhat diagrammatic top plan view of an exemplary bar code image sensor means 11 such as indicated only schematically in FIG. 1. In FIG. 4, the sensor housing 124 is shown as having a light transparent cover window 125 overlying the photodiode array 13. Where the photodiode array comprises five thousand individual elements or pixels, each with a dimension of about seven microns, the intensity sensors 50, 51 and 52 may each have a length of about one-tenth inch or more so as to span many bars of a reflected bar code image, e.g., at least six bar code elements, and reliably sense an average intensity value which is essentially independent of any specific bar code sequence. By way of example, the intensity sensors may be cemented to the exterior surface of window 125 at successive locations along photodiode array 13 but offset from the light entrance path to the photodiode array.

Mirrors 53 and 54, FIG. 2, may be cemented in place on the glass 125 as indicated for mirrors 53' and 54' in FIG. 4. The light sources 24' and 25' in FIG. 4 may be located in wall 130, FIG. 3, at a section as indicated 24-1 in FIG. 3. The mirrors 53' and 54' are secured at angles such that the marker beams will extend parallel to the image path at 60, 81, 80 and 64 and will produce spots of visible light, e.g., of red color, corresponding to spots 28 and 29 in FIG. 2, and spot 28 as indicated in FIG. 3.

In a preferred mode of operation of the embodiments of FIGS. 1–4, manual actuation of the read enable switch 12 will initiate a flash of the illuminator means 15 provided the reader is within its operative range from a bar code label. If the reader is outside of such operative range, momentary actuation of the read enable switch 12 will activate a pair of marker beams such as 26, 27, FIG. 2 representing the lateral margins of the reader field of view. Then, if the reader is moved into operative range and the read enable switch 12 again actuated, the illuminator means 15 will be flashed regardless of the state of focus of the automatically adjustable lens means 30, FIG. 2.

If the initial reading is found to be invalid, the marker beams will automatically be turned on briefly to again delineate the reader field of view, and quickly thereafter the illuminator means will be flashed again. This sequence can be repeated automatically (if the read enable button is held depressed), until the lens means 30 has been automatically adjusted for the distance of the bar code from the reader and a valid reading is obtained.

In the reading of a highly curved bar code label, a plurality of reflected light intensity sensors such as 50, 51 and 52, FIG. 4, may be successively activated in successive flashes of the illuminator means 15, the intensity sensors automatically controlling successive integration times of the bar code image sensor I1, according to the an,erage intensity of reflected light from respective different segments of the curved bar code. Respective segments of a curved bar code label 131 have been indicated at 150, 151 and 152 in FIG. 2. In a first flash illumination of label 131, intensity sensor 51 might measure the reflected light from a bar code segment 151 on the label and cause transfer of the bar code image signals to a receiving means such as a CCD shift register after an integration time optimum for the reading of bar code segment 151. In a second flash quickly following the first, the intensity sensor might control integration time so as to be optimum for the bar code segment 152. Then in a third flash illumination of the bar code 131, the central intensity sensor 50 could control integration time. The control and processing means 10 would then assemble readings for bar code segments 151, 152 and 150 from the successive flashes of illuminator means 15 to determine if a valid total reading had been obtained. If not, a further succession of three flashes of the illuminator means could be enabled, with the indicator beams 28, 29 being turned on in the interval while proper high voltage was building up for the further series of flashes. (Three capacitors of component 17, FIG. 1, could store charge and be discharged rapidly in succession to produce three flashes in rapid sequence without any delay for capacitor recharging.)

For the case of a highly curved bar code label such as indicated at 1311 in FIG. 2, distance sensors 38-1 and 38-2 might indicate that the margins of the bar code would be out of focus. In such a case, as previously mentioned in the introduction to the specification, the processor 10 could be programmed to flash both tubes 35 and 36 with the adjustment means 40 controlled according to the distance reading D2 as sensed by the distance measurement means 38. Thereafter, control of the adjustment means 40 would be related to a distance such as indicated at D22 in FIG. 2 so that marginal portions of the label 131-1 would then be in focus. With the new focus automatically established, tubes 35 and 36 could be again activated so as to read the marginal portions of the bar code on label 131-1, whereupon the processor component 10 could assemble the two readings pixel by pixel to establish a complete bar code.

In another example as previously mentioned, the reader could be provided with a display, and the processor component 10 could cause the display to instruct the operator that the label 131-1 was to be read in two segments, the reader first being positioned so as to be directed toward the left portion of the label 131-1, e.g., with only a tube 36 flashed, and then in a second operation, the reader being physically adjusted so as to be directed toward the right hand portion of label 131-1, and, for example, only the tube 35 flashed.

In another mode of operation as previously mentioned, the reader could be provided with a keyboard, and the operator noting the highly curved configuration of label 131-1, could advise the processor component 10 that a first reading would be taken of the left-hand portion of label 131-1, after which a separate reading would be taken from the right-hand portion of label 131-1.

Along with the multiple readings of a highly curved label such as 13 1-1, the processor 10 could also take account of distance measurements from components 38, 38-1 and 38-2, in assembling e.g., pixel by pixel, a complete bar code from the successive readings.

A. Summary of Exemplary Operation for FIGS. 1 through 4

Since operation is determined by the programming of component 10, many different modes of operation can be implemented. Generally, however, the reading distance sensor means 22 will be activated to read the distance between the front window 33 of the reader and one or more regions of a bar code label. If the distance measured, such as D, FIG. 2, is greater than an operative range of the adaptation means 20, for example, greater than three inches, the adaptation means 20 may be disabled. Thus, for the case of adjustable lens means 30, the motor driven focus adjustment means 40 would be inactive as long as the distance sensor means such as 38 determined that the distance D was outside of the operative range of the lens means 30. In this case, however, preferably the label guide indicator means 21 would be active as long as the scan switch 12 was actuated by the operator, to produce the marker spots as indicated at 28 and 29 in FIG. 2 and as indicated at 28 in FIG. 3. The marker beams 26 and 27 would remain on while switch 12 was actuated and for an interval of, for example, five seconds after release of switch 12, where the reading distance remained outside of the operative range.

Where the switch 12 is actuated and the reading distance sensor means determines that the reading distance is within the operative range, component 10 checks the high voltage generation means 17 to determine if proper voltage is present on the flash capacitor means and if so, turns off the label guide indicator means 21, FIG. 1, and effects a cleaning cycle of the bar code image sensor means 11 so as to prepare the photosensor array 13 for a reading operation. The processor component 10 then initiates a capacitor discharge to activate the flashable illumination means 15. In one embodiment, a single capacitor may be arranged to drive both of the flash tubes 35 and 36 of FIG. 2. In another embodiment, respective individual capacitors may be arranged to drive the respective tubes 35 and 36. In one mode, both capacitors may be discharged to drive both of the tubes 35 and 36 simultaneously. In this mode, an intensity sensor 50, FIGS. 2 and 4, may control the duration of the integration time interval during which the reflected bar code image signal is accumulated at the sensor means 11. At the end of the integration interval, the bar code image signals are transferred for example to a CCD shift register for readout from the sensor means 11. During the readout operation, the signals received by the shift register are not affected by further light impinging on the photodiode array 13. Furthermore, at the end of the integration interval, the flash current interrupter switch 16 may be actuated so as to interrupt discharge from the relevant capacitor or capacitors. In this way, energy is conserved, and recharging of the capacitor means is sped up.

In a second mode of operation, a capacitor associated with flash tube may be activated during a first reading interval under the control of an intensity sensor 51 for insuring an optimum reading of a bar code segment such as indicated at 151 of a label 131, for example, of marked curvature. In a second reading interval, the capacitor associated with flash tube 36 may be activated to illuminate particularly a bar code segment 152, with the integration time of the bar code image sensor means being under the control of an intensity sensor 52 arranged to receive reflected light particularly from bar code segment 152. In one example, intensity sensor 51 would be arranged to generate an average light value by averaging reflected light emanating from a portion 191 of segment 151. Similarly, intensity sensor 52 would receive light from a portion such as 192 of segment 152 where reflected light intensity would be greatest on the average. In this example, the programming of component 10 would be such as to generate the bar code from two successive flashes, one of tube 35 and the other of tube 36. Where the bar code generated based on two such reading intervals fails to provide a valid consistent reading for central segment 130, component 10 could be programmed to produce in a third reading interval, the simultaneous discharge of both capacitors to simultaneously activate both of the flash tubes 35 and 36 under the control of the central intensity sensor 50 which sensor 50 would receive light from a portion 190 of segment 150 which would be expected to provide maximum average light intensity. The component could then be programmed to assemble a complete bar code reading from the three successive reading intervals.

The third interval might be driven by means of a third capacitor connectable to both tubes 35 and 36 so that the three reading intervals could be executed in quick succession. Where a first reading operation is unsuccessful for example, because of an incorrect position of the adjustable lens means 30, component 10 may be programmed to immediately turn on the label guide indicator means 21 during the interval when the capacitor means is being automatically recharged for a succeeding second reading operation. During the recharging operation, e.g., for a time interval of about ninety milliseconds, the label guide indicator means 21 will remain on, and the reading distance sensor means 22 will repeatedly measure the distance to the bar code label with an essentially continuous corresponding control of the lens mean by the focus adjustment means 40. As soon as the component 10 determines that each of the capacitor means has attained the desired voltage for a further flash illumination, the image sensor means 11 will be again cleared and a new reading operation automatically carried out. In each reading sequence as before, one or more of the intensity sensors 50, 51 and 52 determines the time point at which the image signal of the photodiode charge cells is transferred to the CCD shift register stages. Also, after the appropriate integration interval or intervals, the current interrupter switch 16 for a respective capacitor discharge circuit is operated to terminate the capacitor discharge and extinguish the flash of a respective illuminator means. The data resulting from each integration interval is transferred out of the image sensor means 11 via the CCD shift register for processing in component 10. When a successful reading is determined by component 10, the corresponding indicator of component 12 will be activated, and for example, it will be necessary to release switch 12 before a further reading operation can be initiated. Where a given reading operation is unsuccessful, the programming of component 10 may be such that the reading operation is automatically repeated up to, for example, ten times. Should ten successive reading attempts be unsuccessful, component 10 would produce the corresponding bad read condition indication via component 120, and again, for example, it might be necessary for the operator to release switch 12 before 15a further read sequence could be initiated. By way of example, once a valid bar code reading was obtained, the programming could be such that component 10 could establish communication with a host computer system, for example, an accompanying portable computer, or an integral host computer. Where no further actuation of the switch 12 occurs after a valid reading, the system may be- programmed to automatically power down so that a battery means, for example, within reader housing 86, would be subject to the minimum drain during inactive intervals of the reader system.

The foregoing modes of operation could be selected, for example, from the keyboard of a hand-held computer carried by the operator along with the reader unit. The various optional modes of operation could be correspondingly selected with all modes preprogrammed into the component, or desired respective modes of operation could be obtained by loading the corresponding programming from the hand-held computer into component, as desired. Other special modes of operation can be accommodated such as machine gun scanning (which might be used in reading lists of labels). In such an operation, switch 12 could be held depressed while the reader was moved over a series of labels, and the programming would be such as to discard identical adjacent bar code readings. Also, changes could be effected in the operation of the good and bad read indicators of component 120 and changes could be made in the allowed number of retries and the like. While the foregoing description will enable those of ordinary skill in the art to understand and practice the present invention, the following supplemental description is given particularly for demonstrating the availability of a suitable implementation utilizing low cost presently available standard commercial components.

B. Supplementary Discussion

As an example of implementation of the system of FIG. 1, component 10 may be implemented as a Motorola MC68HCII microcontroller. Other processor components which are presently commercially available include a NEC uPD783 10, a National HPC 1 6140, an Intel CMOS MCS8097, and a Hitachi HD64180. Some such components would need more external devices than others, e.g., such as analog to digital conversion channels, ROM, RAM, EEPROM (or equivalent non-volatile RAM), etc. Generally, as higher speed processors become available, and processors with more internal memory and conversion facilities, the utilization of such processors will be advantageous. FIGS. 5, 10, 11 and 12 herein are shown as using signals from the Motorola MC68HCI 1. All other inputs and outputs are general processor pins, so that a drawing showing the processor of component 10 is not necessary.

Figure 5:
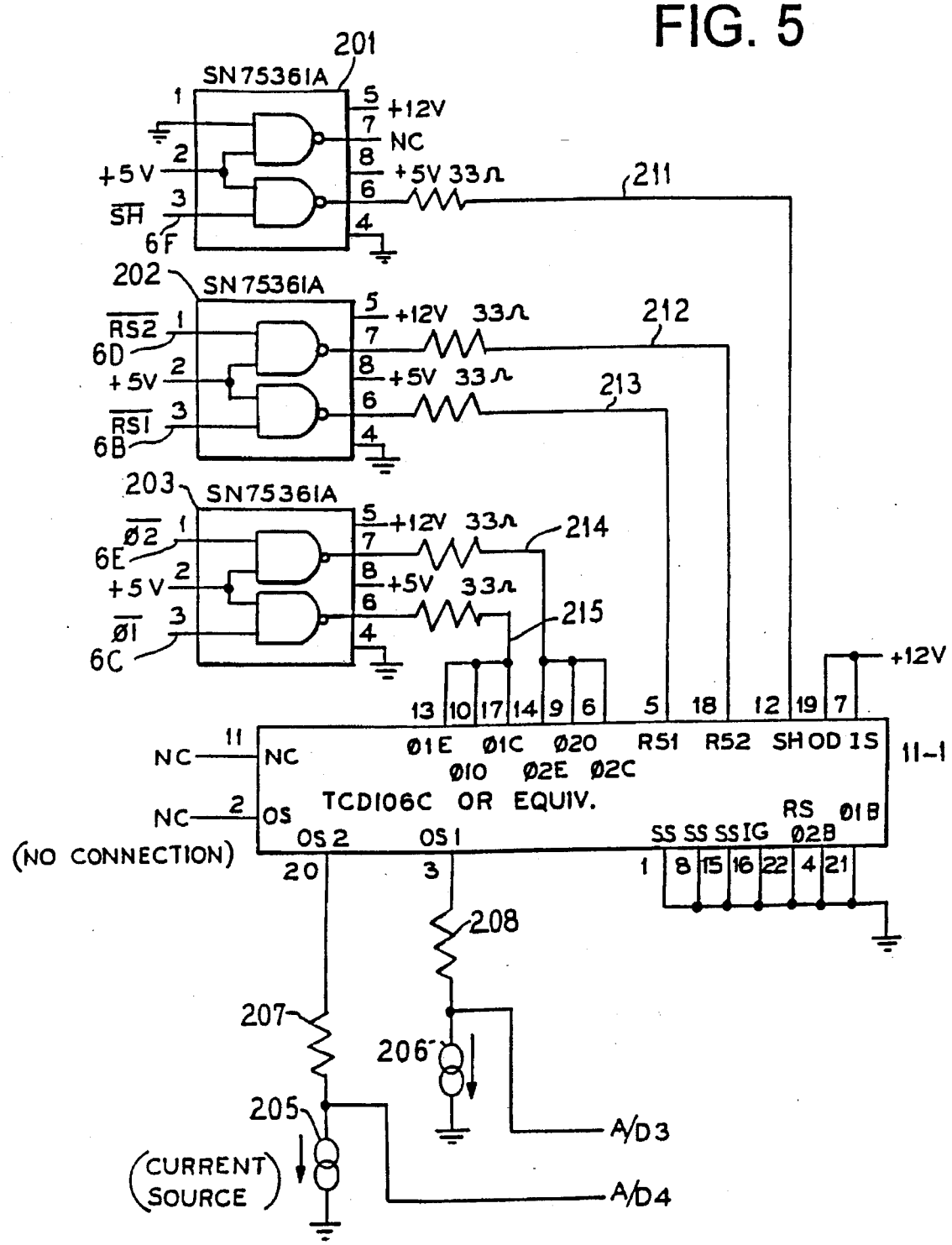
FIGS. 5, 6 and 7 are electric circuit diagrams for illustrating an exemplary implementation of component 11 of FIG. 1.

In FIG. 5, reference numeral 11-1 indicates a specific component for use in the bar code image sensor means 11 of FIG. 1. By way of specific example, component 11-1 may comprise a solid state integrated circuit chip such as type TCD106C image sensor or the equivalent. Component 11-1 includes a charge coupled device (CCD) shift register driven for example utilizing two megahertz clock signals from driver components 201, 202 and 203. Where components 201–203 are implemented as type 75361 drivers. These components serve to convert the five volt input logic signals to the twelve volt level needed to drive component 11-1. Current sources 205 and 206 in conjunction with resistors 207 and 208 provide a DC offset to bring the video output levels from the shift registers into an acceptable input range for the analog to digital converter channels A/D3 and A/D4 of component 10.

Figure 6:
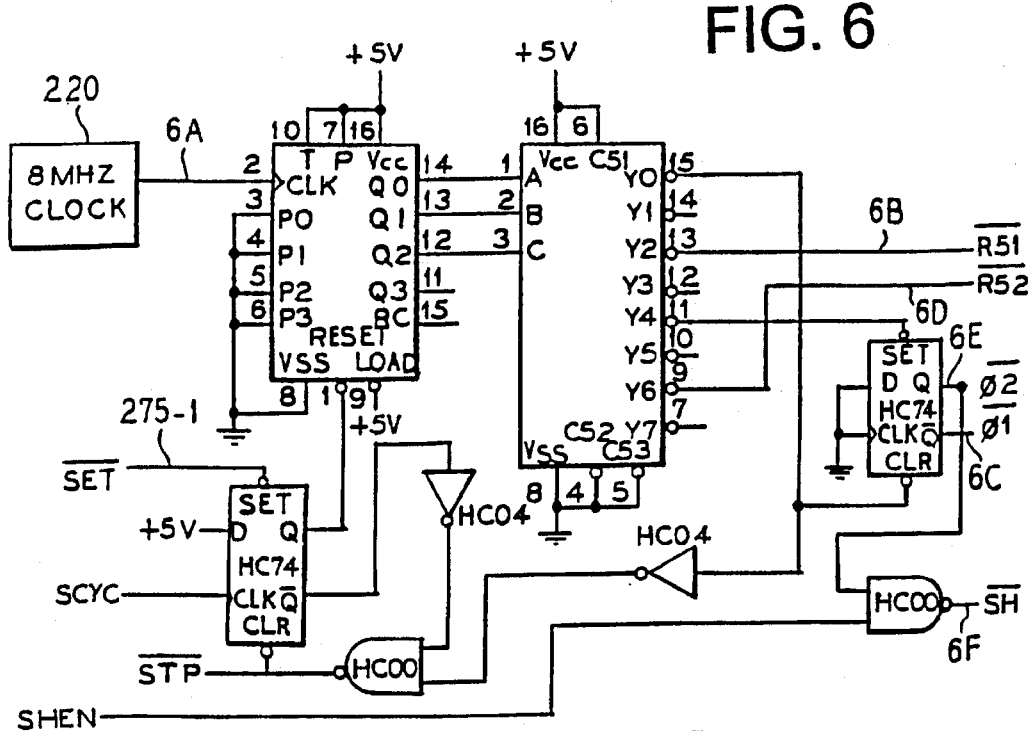

The microcontroller of component 10 could drive each signal line directly, but the bit manipulation capabilities of most presently available processors would provide a very slow preparation and reading cycle time for the case of a bar code image sensor size of 5000 pixels. The circuit shown in FIG. 5 uses an eight megahertz clock 220, FIG. 6, to produce a controlling sequence which can clock out two pixels every microsecond from component. The circuit of FIG. 6 allows continuous operation such as is needed to quickly prepare the component 11-1 for a reading operation and also allows single-stepping operation to give the analog to digital converter channels sufficient time to input each pixel. The circuit of FIG. 6 allows each shift pulse to be synchronized with the clock rate at line 215, FIG. 5, (the 0110 clock line) for proper operation. it is desirable to operate at the highest frequency possible without unduly complicating or increasing the size of the driver circuitry, Thus, an image sensor with a higher maximum clocking rate could be selected. In FIG. 6, reference characters 6A through 6F have been applied to various lines and the corresponding related waveforms have been indicated in FIGS. 6A through 6F, respectively, by way of explanation of the operation of FIG. 6. The outputs of FIG. 6 form respective inputs to drivers 201, 203 of FIG. 5 as indicated by the respective designations of the corresponding lines in these figures. In FIG. 6A, reference numeral 231 indicates the first positive transition of the clock waveform after the signal (supplied by the aforementioned MC68HC I I microcontroller) goes low, or the signal line SCYC goes high. In FIG. 6F, the signal SH follows the dash line 232 if the signal SHEN is true. As indicated at 241–244 by dash lines, the cycling continues if the signal IVT remains low.

Figure 7:
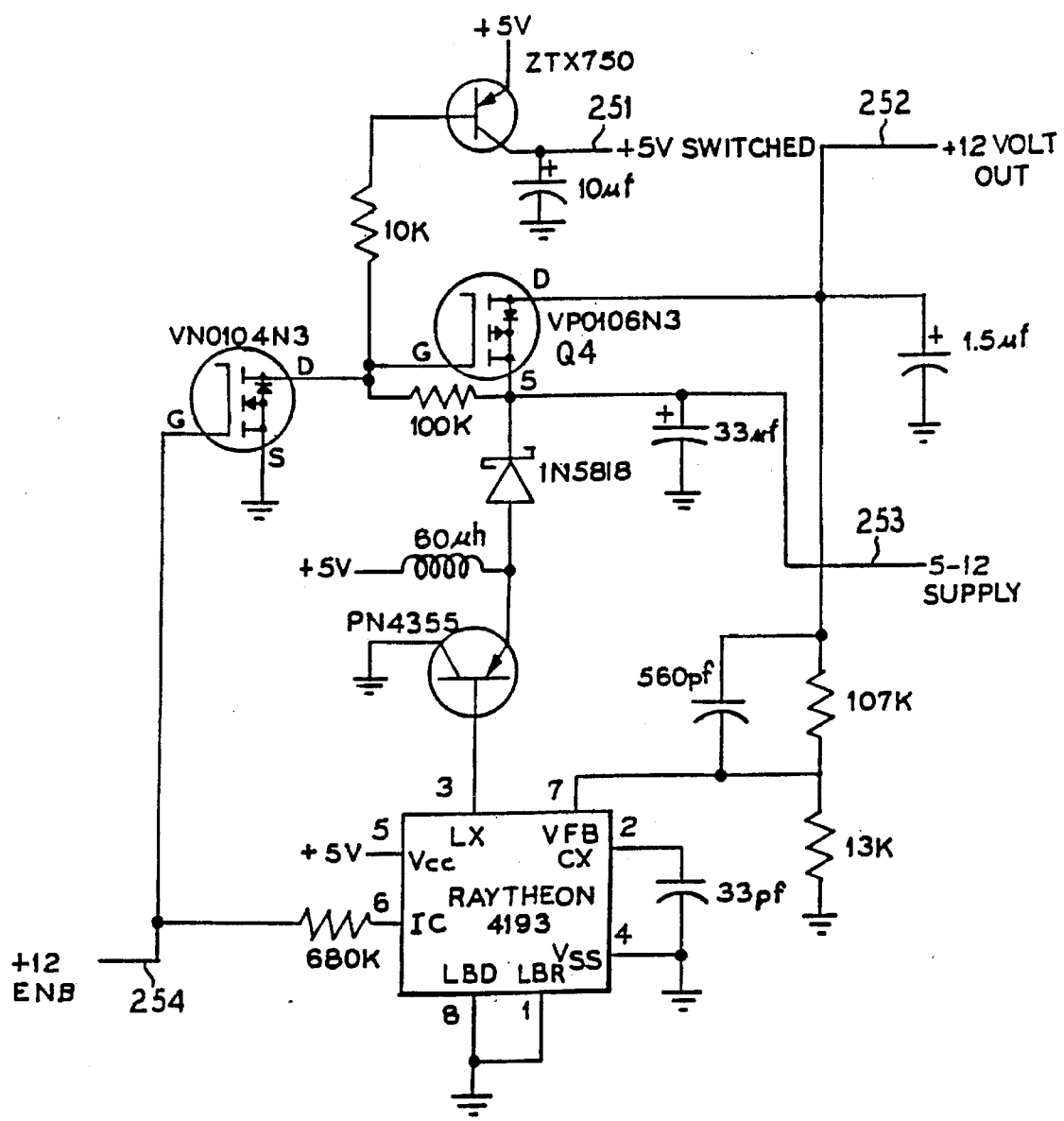

Component 11-1 requires twelve volts for proper operation and a circuit for providing this voltage from the five volt supply available is indicated in FIG. 7. This circuit should be able to be powered down when not in use in order to conserve power. A drawback of the circuit of FIG. 7 is that when it is turned off, the inductor LI provides plus five volts to the plus twelve volt circuits unless a transistor Q4 is added to block the five volts.

Line 251 in FIG. 7 receives a switched plus five volts for supply to the drivers 201–203 of FIG. 5. Line 251 may also supply five volts to any other circuit which is not needed when the twelve volts is off. The five volts at line 251 is switched off with the plus twelve volts at line 252 to completely power down the image sensor component 11-1 of FIG. 5 and drivers 201–203. An output line 253 in FIG. 7 provides five volts when the twelve volts are shut off and provides twelve volts when the line 254 (+(+12 ENB)) is enabled. The voltage at line 253 is used to drive an oscillator 255 of FIG. 8 which is utilized in the present commercial instant bar code reader. Circuits suitable for implementing FIG. 7 desirably exhibit low cost, high efficiency and least number of parts.

Figure 8:
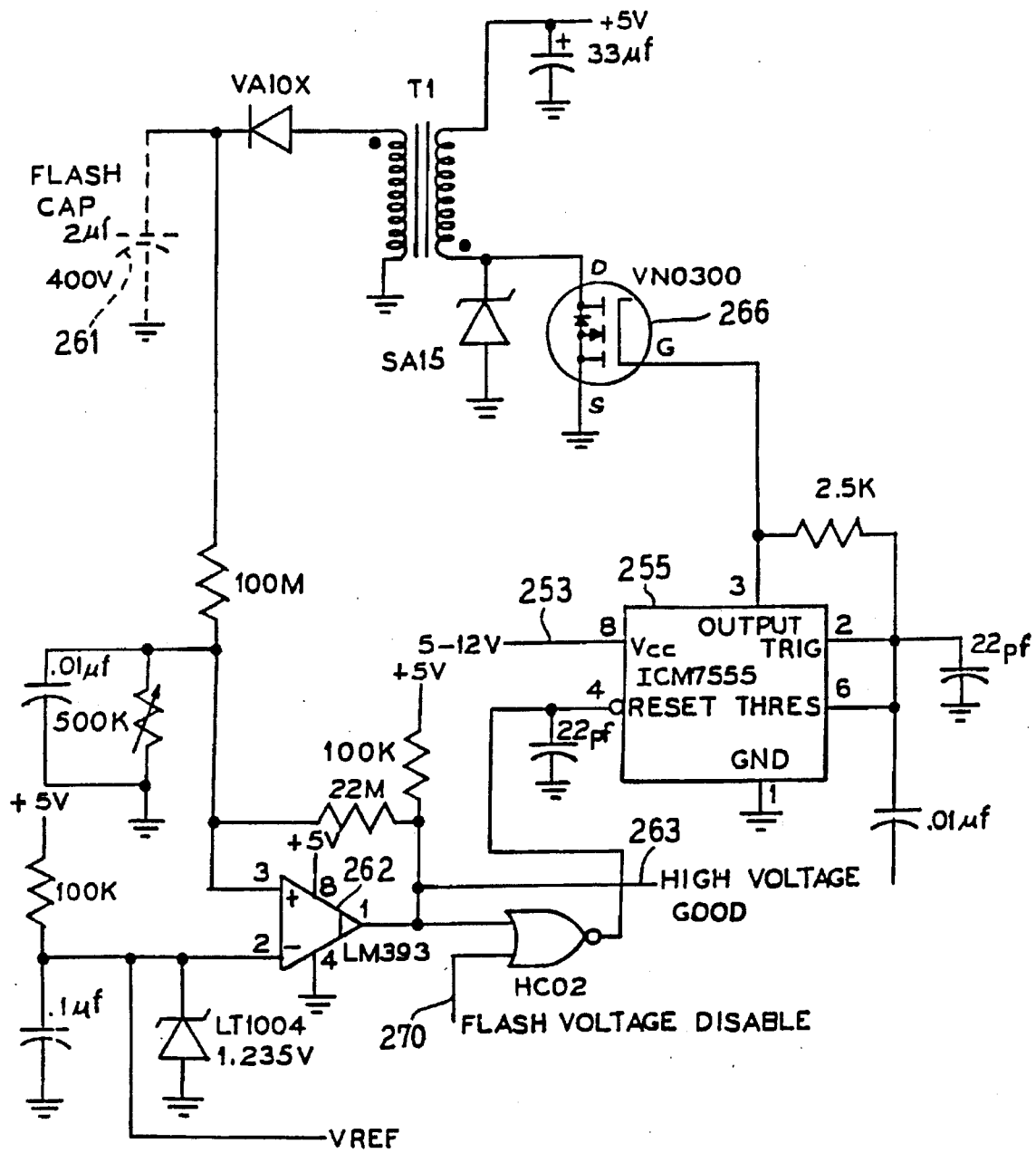
FIGS. 8 and 9 show an exemplary implementation of components 15, 16 and 17 of FIG. 1.
Figure 9:
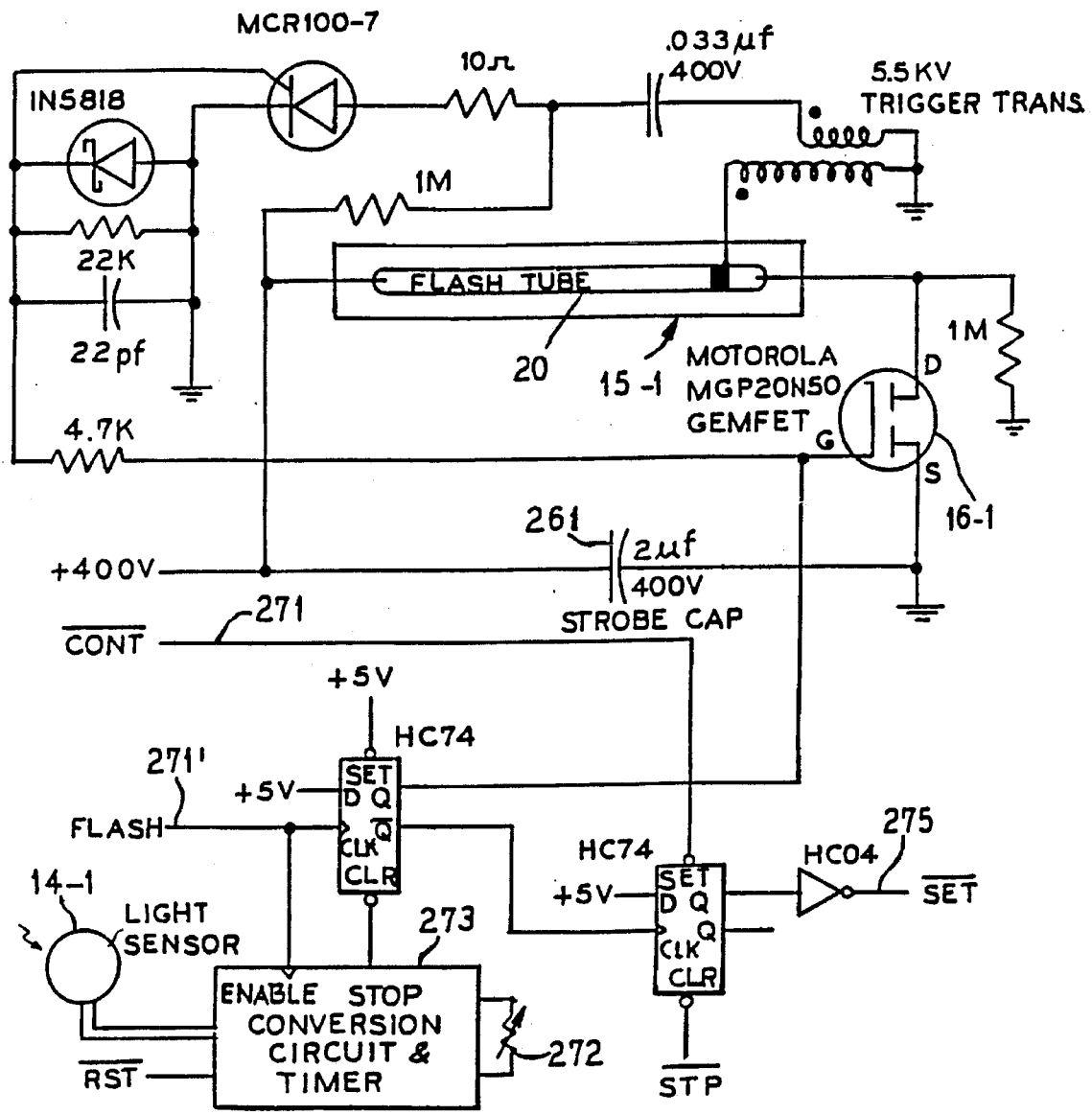

FIG. 8 illustrates a suitable high voltage generator circuit for generating approximately 300 volts for the xenon flash tube 260 illustrated in FIG. 9. The circuit shown in FIG. 8 is similar to that of the present commercial instant bar code reader. The transformer TI of FIG. 8 uses a gapped core and is actually a transforming inductor. Magnetic energy is stored in the core on respective first half cycles, and on opposite half cycles the field collapses and generates very high secondary voltages which are used to charge the flash capacitor 261. By way of example, transformer TI may be a Ferroxcube 1408 PA 250-3B7 with a turns ratio of forty-three to one. Transformer TI exhibits a 100 microhenry inductance at its primary side and 185 millihenries on the secondary side. This type of circuit will continue to charge the capacitor 261 beyond its rating, if not stopped, so a comparator 262 is used to control the oscillator 255. The output of comparator 262 at 263 is a logic signal that indicates to component 10 that proper flash voltage is available. The five-twelve volt supply line 253 is used to energize oscillator 255 in the circuit of the present commercial instant bar code reader since the oscillator component 255 drives transistor 266 more efficiently when running from twelve volts. However, the flash capacitor charging circuit must also run from plus five volts. The circuit of the present commercial instant bar code reader provides a relatively high initial input current of up to two amperes during charging of capacitor 261. This only lasts a few milliseconds, but it requires the host providing power to the reader to be able to handle the high current surge. A more uniform charging current over the duration of the allowed charge time, say a relatively constant charging current of four tenths ampere over a time interval of about one hundred and fifty milliseconds would be more desirable. If it is permissible to recharge the flash capacitor only four times per second, for example, rather than ten times per second, component 10 may be programmed to control the charge rate to allow the lowest current level, for example, a charge rate of 250 milliamperes over a charging interval of 250 milliseconds could be switched on by the programming where a flash rate of four times per second would be acceptable.

Much of the flash tube illumination circuit shown in FIG. 9 is used in the present commercial version of instant bar code reader. The addition of component 16-1 corresponding to flash current interrupter switch 16, FIG. 1, is advantageous to interrupt the flash when sufficient light has been detected by the intensity sensor means 14. Without a means for interrupting the flash, the flash capacitor such as 266-1, FIG. 8, will be drained, producing additional unneeded light. Furthermore, the capacitor will have to be recharged from zero requiring that much more current and elapsed time. Thus, the use of intensity sensor means 14 and switch means 16 not only reduces the power requirement so as to increase the operational time of the system in portable applications using batteries, but also enhances the performance of the unit by enabling more rapid flashes of the illuminator means. Input 270 (FLASH VOLTAGE DISABLE) FIG. 8, and input 271 CONT and input 271' (FLASH), FIG. 9, can be controlled from component 10. Because the output of the xenon flash tube 260 is of such short duration (about twenty microseconds), processor intervention to control integration time is not practical with presently available processors.

Accordingly, FIG. 9 illustrates a light sensor means 14-1 corresponding to intensity sensor means 14, FIG. 1, as being coupled with the switch 16-1 and the illuminator means indicated generally at 15-1 by means of a hardware circuit which can be trimmed for example, as indicated by variable resistance means 272 associated with conversion circuit and timer component 273. The circuit of FIG. 9 not only causes a "set" output pulse at 275, FIG. 9, to initiate the shift sequence in the CCD component 11-1, FIG. 5, via input 275-1, FIG. 6, but also stops the flash tube by interrupting the flash tube current utilizing component 16-1, which may, for example, be a Motorola Gemfet, type MGP2ON50. Component 16-1 needs to be able to handle the forty amperes peak during discharge of capacitor 261.

Figure 10:
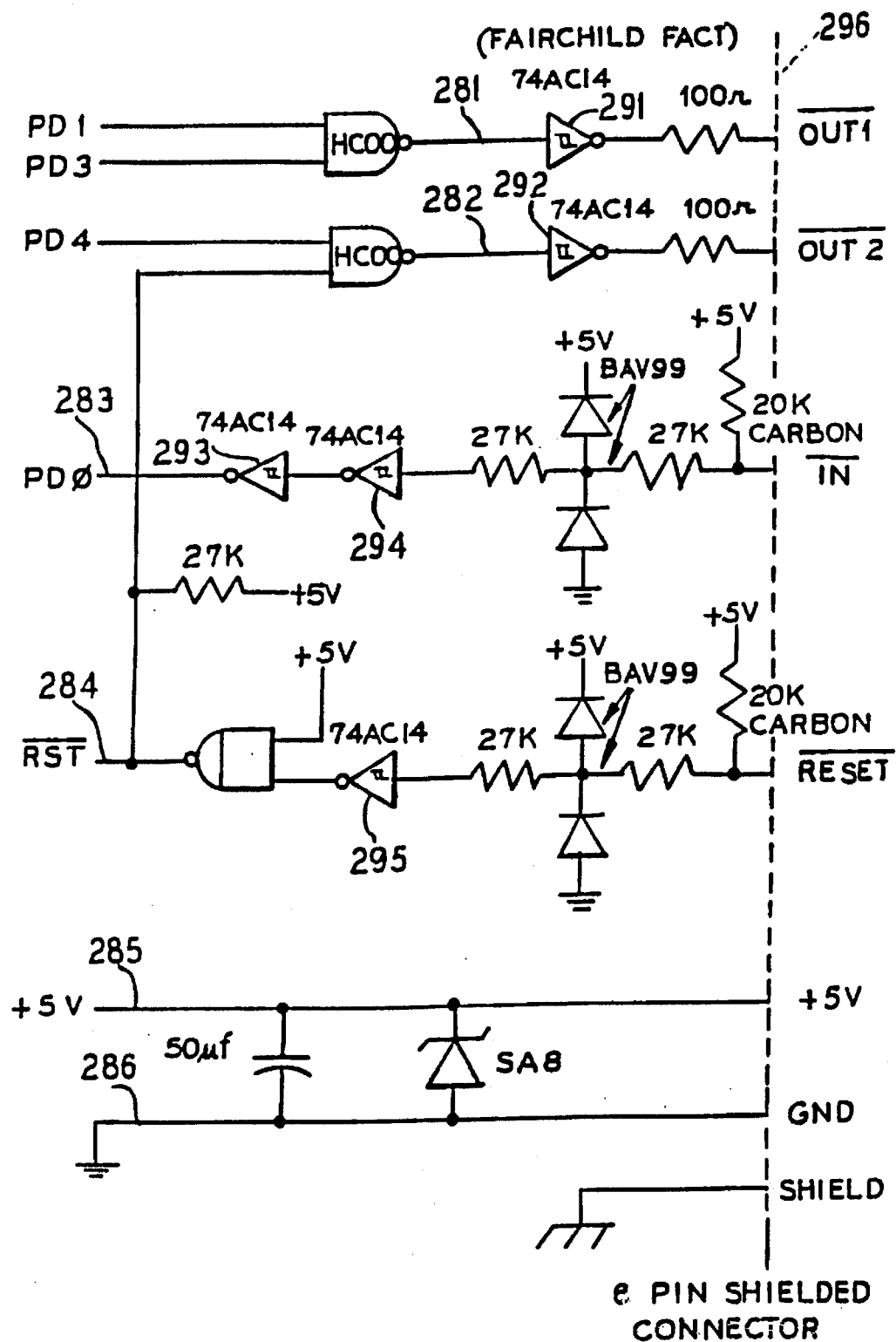
FIG. 10 is an electric circuit diagram for illustrating an exemplary implementation for component 121 in FIG. 1.

The microcontroller of component 10, FIG. 1, may be connected to host computer with a six conductor shielded, coiled cable such as indicated at 122, FIG. 1, by means of circuitry, such as shown in FIG. 10. The shield should be a braid or spiral wrapped type, but not a foil with a drain wire. Each wire should have a number of twists per inch to give it maximum flexibility. There are two lines 281 and 282 driven by the reader that can be programmed as ASYNC or SYNC data out, and two lines into the reader, a line 283 serving as a programmable serial data in line, and a line 284 dedicated as an activelow reset line. The other two lines 285 and 286 are power (plus 5 V) and signal ground.

Figure 11:
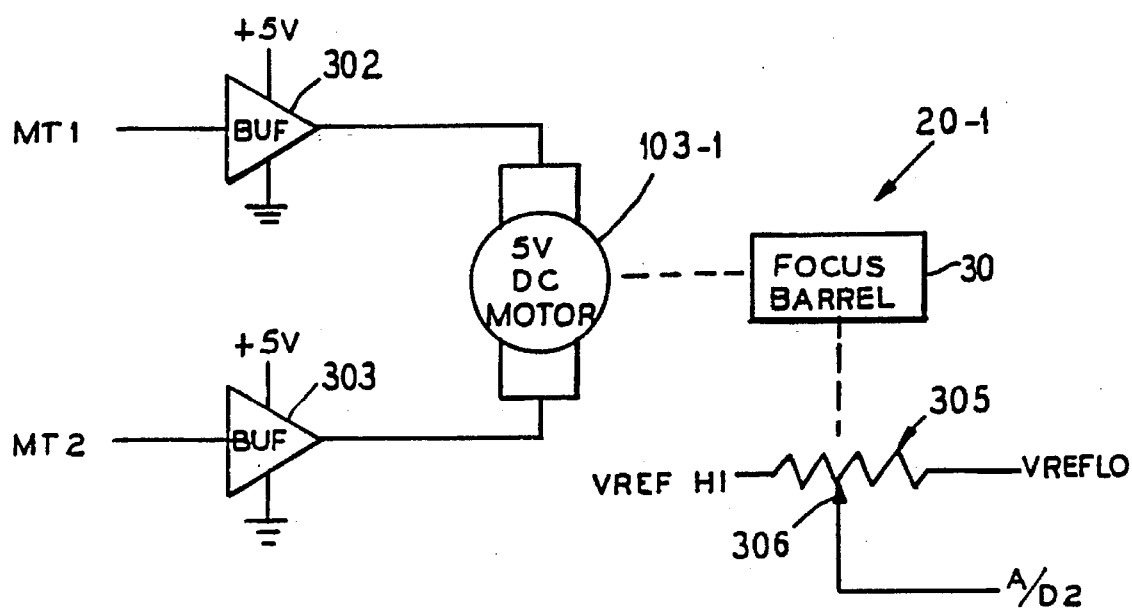
FIGS. 11 and 12 are diagrammatic illustrations for indicating an exemplary implementation of component 20 in FIG. 1.
Figure 12:
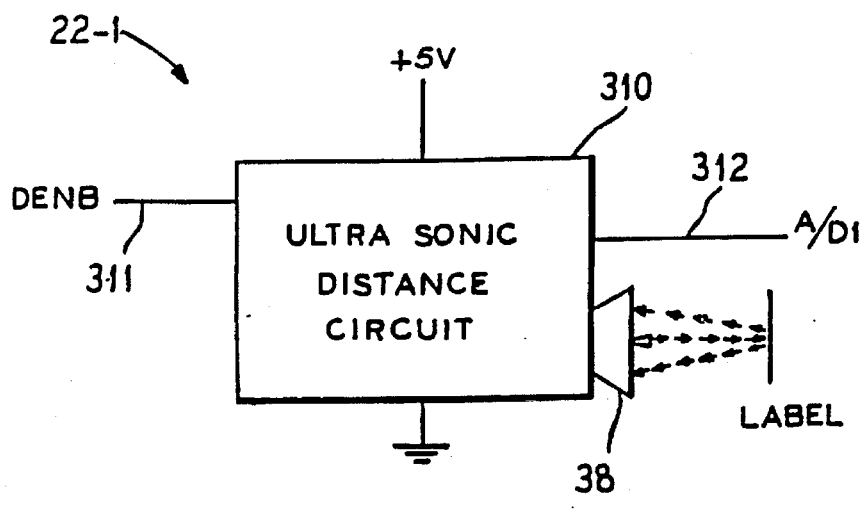

FIG. 10 shows Fairchild type 74AC14 devices as being utilized for buffer and receiver components 291–295. This component was used because of its built-in hysteresis and balanced high output drive (24 mA) capability. The various resistors and diodes are used for ESD (electrostatic discharge) protection up to 25,000 volts. A six-pin connector may be used at 296 of a style similar to that used on industrial camera cables. FIG. 11 shows an implementation 20-1 of the automatic reading distance adaptation means of FIG. 1. In FIG. 1, a DC motor 103-1 is controlled from the microcontroller of component 10 via power drivers 302 and 303. The drivers 302 and 303 are selectively energized so as to drive the motor 301 in the correct direction for improving focus. A feedback transducer 305 is shown as having a movable tap 306 mechanically coupled with the focus barrel 30 and thus being driven jointly therewith by motor 103-1 so that analog to digital converter channel A/D 2 receives a resistance value in accordance with the actual adjusted position of the optics 30. FIG. 12 shows an implementation 22-1 of reading distance sensor means 22 including an ultrasonic distance measurement circuit 310 associated with ultrasonic transducer 38. A disable line 311 (DENB) for the circuit 310 may be controlled by the microprocessor component 10 of FIG. 1, and the analog distance measurement value maybe supplied via output line 312 to an analog to digital converter channel A/D 1. All parameter and calibration/conversion tables for the ultrasonic distance measurement can reside in the memory of component 10.

The audio indicator of component 120 can be driven from a frequency created by the processor of component 10, if desired. All light emitting diode indicators are controlled by the processor as indicated in FIG. 1. The switch 12 connects to a processor input pin but should be able to interrupt and wakeup the processor if the reader is in a standby/sleep mode. Label guide indicator means 21 preferably provides two indicator beams as previously described, it being conceivable to produce the two beams from a single light emitting diode which is directed initially to a partially reflecting mirror which is also partially transmissive along the length of the photosensor array 13 to a completely reflective mirror at the opposite end of the array. The marker light emitting diode or diodes are turned off during the clearing of the image sensor and the energization of the flashable illuminator means to prevent their saturating the image sensor with light and thus interfering with an accurate bar code reading.

It is desirable to maintain the largest depth of field possible (for each fixed position of lens arrangement 30) to not only allow easier and faster focusing, but also to allow focusing on uneven surfaces such as the curved bar code configuration presented by label 131 indicated in FIG. 2.

For the purpose of enlarging the depth of focus, and increasing the speed of adaptation of the reader to a given bar code configuration, the reader housing 10 may accommodate a plurality of adjustable lens means with respective overlapping depths of field so that for fixed positions of the lens means, the depth of field is greatly enlarged. Such multiple lens barrels could be adjusted simultaneously so that the lens systems in each position thereof have the total depth of field greatly enlarged. As an example, mirror 82, FIG. 3, could have an upper segment bent oppositely to the segment receiving an image at axis 64, so that a second bundle of reflected light would be directed upwardly as viewed in FIG. 3 toward a second mirror similar to a mirror 83 but with an opposite inclination so that the second image is directed rearwardly in housing 86 parallel to path 81 but above mirror 82, the second image passing through a second lens barrel similar to barrel 90 but located, for example, rearwardly of barrel 90 so as to focus on bar code images closer to the window 33, for example, than the barrel 90.

Figure 13:
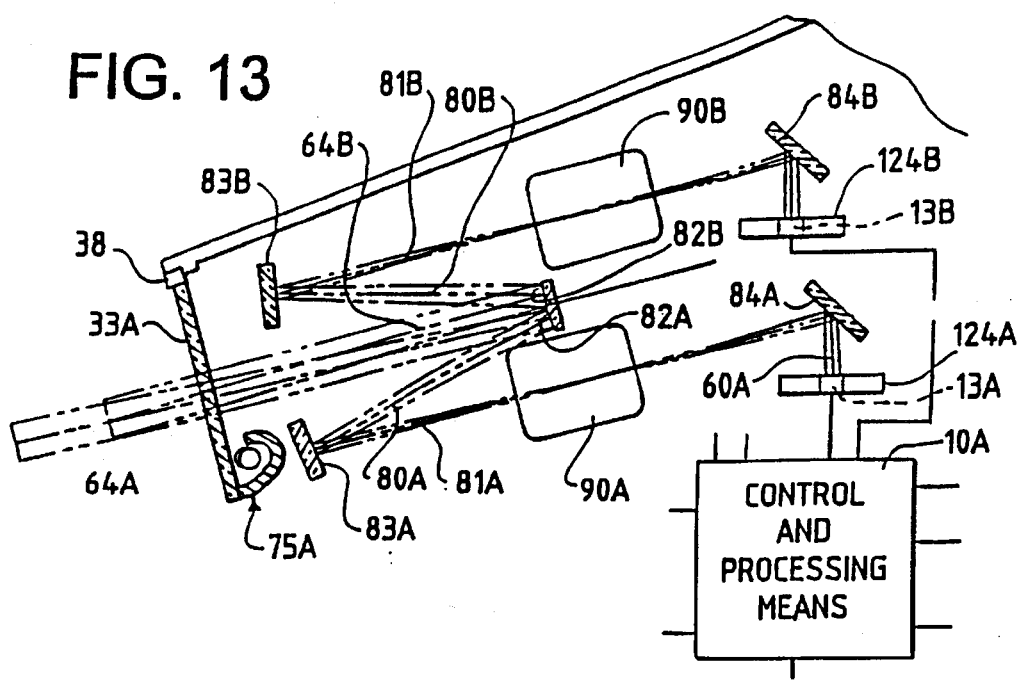
FIGS. 13 and 14 illustrate examples of alternative arrangements in accordance with the invention.

FIG. 13 diagrammatically illustrates the optical components of such an arrangement, which includes a window 33A, a flash tube housing 75A, a mirror segment 82A, a mirror 83A, a mirror 84A, a lens barrel 90A, and a sensor housing 124A, respectively, corresponding to components 33, 75, 82, 83, 84, 90, and 124 of the arrangement of FIG. 3, and providing optical axes 60A and 64A and paths 80A and 81A, respectively, corresponding to paths 60 and 64 and paths 80 and 81 of FIG. 3. The arrangement also includes an upper mirror segment 82B bent oppositely to the segment 82A and receiving an image at an axis 64B to direct light upwardly to a mirror 83B having an inclination opposite to that of the mirror 83A. A second image is directed rearwardly along an axis 81B parallel to axis 81A to pass through a second lens barrel 90B located rearwardly with respect to barrel 90A so as to focus on bar code images closer to the window 33A. One dimensional photosensor arrays 13A and 13B within sensor housing 124A and 124B are connected to control and processing means 10A.

Distance measurement means 38 may be coupled with control and processor means 10A in order to provide range information to processor 10A such that the proper focal path A or B may be selected. This may be accomplished by simply allowing the processor 10A to operatively select a particular one-dimensional array (124A, 124B).

Figure 14:
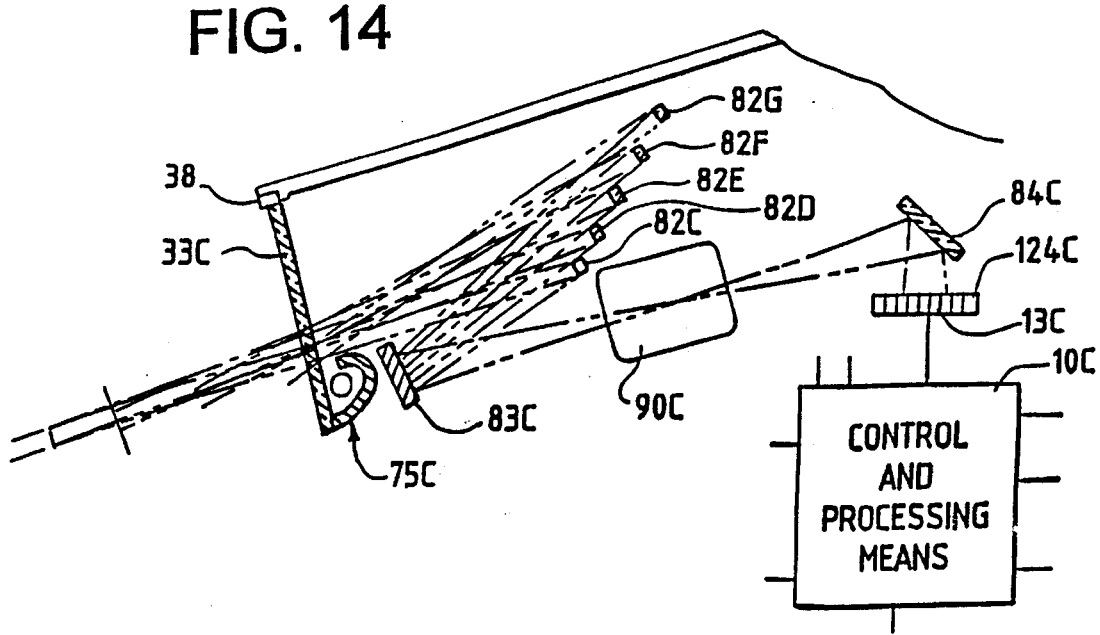

In another example, a plurality of mirrors analogous to mirror 82 could be arranged at respective different distances from the window 33, such that all of the image paths would traverse the same lens barrel 90 but then would be focused onto respective different image sensors, for example, by means of multiple mirrors analogous to mirror 84 but located at respective different distances from the center of lens barrel 90. Such a multiple image path lens system would, for example, provide paths within the reader of length greater than the length of the image path at 64, 80, 81, 60 of FIG. 3, and also optical image paths in the housing 86 of length shorter than the length of the path 64, 80, 81, 60. The various image paths together could provide the result that the depth of field for each respective image path would overlap with the depth of field of other of the image paths, so that the single lens barrel such as 90 would cover images anywhere within a range in front of a window 33 corresponding to a multiple of the depth of field provided by the image path 64, 80, 81, 60 by itself. Thus, through proper multiple mirror placement and folding of the optical image paths, a common lens barrel assembly could focus on multiple depths in front of the reader, the processor component 10 selecting the respective image sensor or image sensors from which to assemble the pixels of a complete bar code reading. FIG. 14 diagrammatically illustrates the optical components of such a multiple image path single lens system, which includes a window 33C, flash tube housing 75C, mirror 83C, mirror 84C, lens barrel 90C and sensor housing 124C, corresponding to components 33, 75, 83, 84, 90 and 124 of FIG. 3, and components 33A, 75A, 83A, 84A, 90A and 124A of FIG. 13. The system of FIG. 14 further includes a plurality of mirrors 82C, 82D, 82E, 82F and 82G at respective different distances from the window 33C, such that all image paths traverse the same lens barrel 90C, to be focused on different image sensors of an array 13C which are within a housing 124C and which are connected to control and processing means 10C operative to select the respective image sensor or image sensors from which to select the pixels of a complete bar code reading. With such a multiple image path single lens system arrangement, the lens system arrangement could remain stationary, avoiding the requirement for a motor and movable parts, and also providing for instantaneous reading of a label whose various segments came within the depth of field of one or more of the respective image paths and associated image sensors. Further, distance measurement means 38 may be coupled with control and processor means 10C in order to provide range information to processor 10C such that the proper focal path C, D, E, F, or G may be selected. This may be accomplished by simply allowing the processor 10C to operatively select a particular line 13C of the two-dimensional array 124C.

It will be apparent that many modifications and variations may be effected without departing from the teachings and concepts of the present disclosure.

We claim:

1. In an optically readable information set reader system, a hand-held bar code reader positionable by hand at varying distances from an information set to be read and operable for reading information sets at distances from said reader within a certain operative range, said reader comprising:
   (a) optically readable information set sensor means for generating an output signal in accordance with an information set image incident thereon;
   (b) distance measurement means for automated reading of distances of an information set from the reader;
   (c) reading distance adaptation means for automatically adapting the reader to the reading of an information set at varying distances therefrom; and
   (d) control means to enable or inhibit readings by said sensor means and for adjustment of said reading distance adaptation means in response to said distance measurement means.

2. An optically readable information set reader system as recited in claim 1, wherein said distance adaptation means comprises an adjustable lens system responsive to said distance measurement means.

3. An optically readable information set reader system as recited in claim 1, further comprising marker means to facilitate aiming of said system.

4. An optically readable information set reader system as recited in claim 1, further comprising a flashable illuminator means for producing a reflected image of the information set for reading by said sensor means.

5. An optically readable information set reader system as recited in claim 4, further comprising a flash interrupter means.

* * * * *